United States Patent [19]

Lang et al.

[11] Patent Number: 5,615,054
[45] Date of Patent: Mar. 25, 1997

[54] ADJUSTABLE REAR-VIEW MIRROR WITH A RELEASABLE MIRROR PLATE

[75] Inventors: Heinrich Lang, Ergersheim; Wolfgang Seiboth, Bad Windsheim, both of Germany

[73] Assignee: MEKRA Rangau Plastics GmbH & Co KG, Germany

[21] Appl. No.: 245,952

[22] Filed: May 19, 1994

[51] Int. Cl.⁶ .................................................. B60R 1/02
[52] U.S. Cl. .................. 359/844; 359/841; 359/855
[58] Field of Search ........................ 359/872, 876, 359/877, 841, 844, 849, 864, 865, 871, 850, 855

[56] References Cited

U.S. PATENT DOCUMENTS 4,764,004  8/1988  Yamada et al. ........................ 359/872
4,877,214  10/1989  Toshiaki et al. ....................... 359/877
5,355,255  10/1994  Assinder ............................... 359/871

FOREIGN PATENT DOCUMENTS 3825648.7  2/1990  Germany .......................... B60R 1/02

Primary Examiner—Timothy P. Callahan
Assistant Examiner—Terry L. Englund
Attorney, Agent, or Firm—Laff, Whitesel, Conte & Saret, Ltd.

[57] ABSTRACT

An adjustable rear-view mirror arrangement for vehicles has a housing, a bearing arrangement arranged in the housing with a retaining plate in particular integrally united with the bearing arrangement for the adjustable positioning of a rear-view mirror and a mirror supporting plate fastenable to the retaining plate for the mounting of a mirror glass and arranged in a housing opening. In the vicinity of two opposite parallel lateral edges, the retaining plate is provided with joining projections, which for being fastened to the mirror supporting plate, are insertable by clamping into rear-recessed portions of complementary shape on the mirror supporting plate in parallel to the plate plane.

18 Claims, 7 Drawing Sheets

ADJUSTABLE REAR-VIEW MIRROR WITH A RELEASABLE MIRROR PLATE

BACKGROUND OF THE INVENTION

1. Field of the Invention

The invention relates to an adjustable rear-view mirror arrangement for motor vehicles and in particular for utility vehicles comprising a housing with a housing opening, a bearing arrangement arranged in the housing, a retaining plate united with the bearing arrangement and provided with two lateral edges opposite to each other and a plate plane, a mirror supporting plate releasably fastenable to said retaining plate, and a mirror glass mounted on said mirror supporting plate and arranged in said housing opening.

2. Background Art

A rear-view mirror arrangement of the generic type is specified in U.S. patent application Ser. No. 08/132,720. This application does not give any details on the assembly of the retaining plate provided for the adjustable location of the rear-view mirror in the housing and a mirror supporting plate for mounting a mirror glass.

Furtheron, DE 38 25 648 A1 teaches an adjustable rear-view mirror in which the mirror glass is retained on a mirror glass support by means of a retaining frame which is joined to the latter at least partially detachably.

This construction has the disadvantage that on the one hand, a retaining frame of comparative filigree structure is used for mounting the loose mirror glass. Moreover, during the assembly of the mirror, the mirror glass must be handled without any special protecting and supporting base construction, which adds to complicate the assembly unnecessarily.

SUMMARY OF THE INVENTION

It is an object of the invention to improve an adjustable rear-view mirror arrangement of the generic type such that distinctly simplified mounting of the mirror glass is possible accompanied by the attainment of sufficiently stable and reliable location.

This object is solved in that adjacent to said lateral edges, the retaining plate is provided with joining projections, which for being fastened to the mirror supporting plate, are insertable by clamping into rear-recessed portions of complementary shape on the mirror supporting plate substantially in parallel to said plate plane. Accordingly, a clamping and locking connection between the retaining plate and the mirror supporting plate retaining the mirror glass is provided such that joining projections on the retaining plate are insertable, in parallel to the plate plane, into rear-recessed portions of complementary shape on the mirror supporting plate. The clamping ensures high stability of the joint, the ease of mounting being achieved by the simple sliding motion. Simultaneously, for assembly, the mirror glass is not handled as such but in a way fastened on the mirror supporting plate and thus protected.

Advantageous embodiments of the joining projections on the retaining plate and of corresponding retaining projections for forming rear-recessed portions on the mirror supporting plate consist in that the joining projections are formed in one piece on the retaining plate and located on the latter's lateral edges in the plate plane, and in that on both sides of the retaining plate, the mirror supporting plate is provided with ridges projecting inwards and extending parallel to the direction of insertion of the joining projections, from which ridges retaining projections project in a direction towards each other for the forming of rear-recessed portions.

According a preferred embodiment, the rear-recessed portions are defined, on the side opposite the retaining projections, by continuous supporting ribs extending parallel to the direction of insertion on the inside of the mirror supporting plate. The rear-recessed portions on the mirror supporting plate are exactly defined by the supporting ribs, there being the possibility that the mirror supporting plate itself is convex in accordance with a convexity of the mirror glass.

In keeping with a preferred embodiment, the joining projections and the retaining projections are of about equal length referred to the direction of insertion, and the free distance between the retaining projections slightly exceeds the length of the joining projections referred to the direction of insertion. The dimensioning given accordingly serves to optimize the clamping between the retaining and the mirror supporting plate, since maximal lengths of the joining projections and retaining projections producing the clamping between the retaining plate and the mirror supporting plate are achieved as a result of these measures referred to a predetermined size of the retaining plate.

The transverse ridges provided according to another preferred embodiment form limit stops for the initial position of mounting as well as for the final position of mounting, which again results in a simplification of the mounting.

The insertion lugs provided according to another preferred embodiment, on the retaining projections of the mirror supporting plate serve the same purpose.

Additional reliability of the clamping and locking connection between the retaining plate and the mirror supporting plate is achieved by the measures given in that a locking is provided for securing the mirror supporting plate on the retaining plate in the final position of mounting, and in that the locking is formed by a locking projection projecting from the inside of the mirror supporting plate and backing the transverse lateral edge, directed opposite the direction of insertion, of the retaining plate in the final position of mounting.

If, inadvertently—for instance because of excessive vibrations of the housing—the clamping and locking connection between the retaining and the mirror supporting plate proves not sufficiently stable and if the additional locking mechanism possibly available between these two components is overcome, another preferred embodiment provides as an additional safeguard that the mirror supporting plate with the mirror glass is arranged in the customary housing opening such that any total release of the sliding engagement of the mirror supporting plate with the retaining plate is impossible during "normal" adjustment of the rear-view mirror. Consequently, the mirror supporting plate with the mirror glass cannot inadvertently fall out of its mounting in the housing. Only when the bearing arrangement has been moved into an extremely tilted position of mounting, the sliding engagement of the mirror supporting plate with the retaining plate can be released, for instance for the exchange of a defective mirror glass, and produced for the mounting of the rear-view mirror arrangement according to the invention.

Further features, details and advantages of the invention will become apparent from the ensuing description of an exemplary embodiment of the subject matter of the invention taken in conjunction the drawings.

DESCRIPTION OF THE PREFERRED EMBODIMENT

Figure 1:
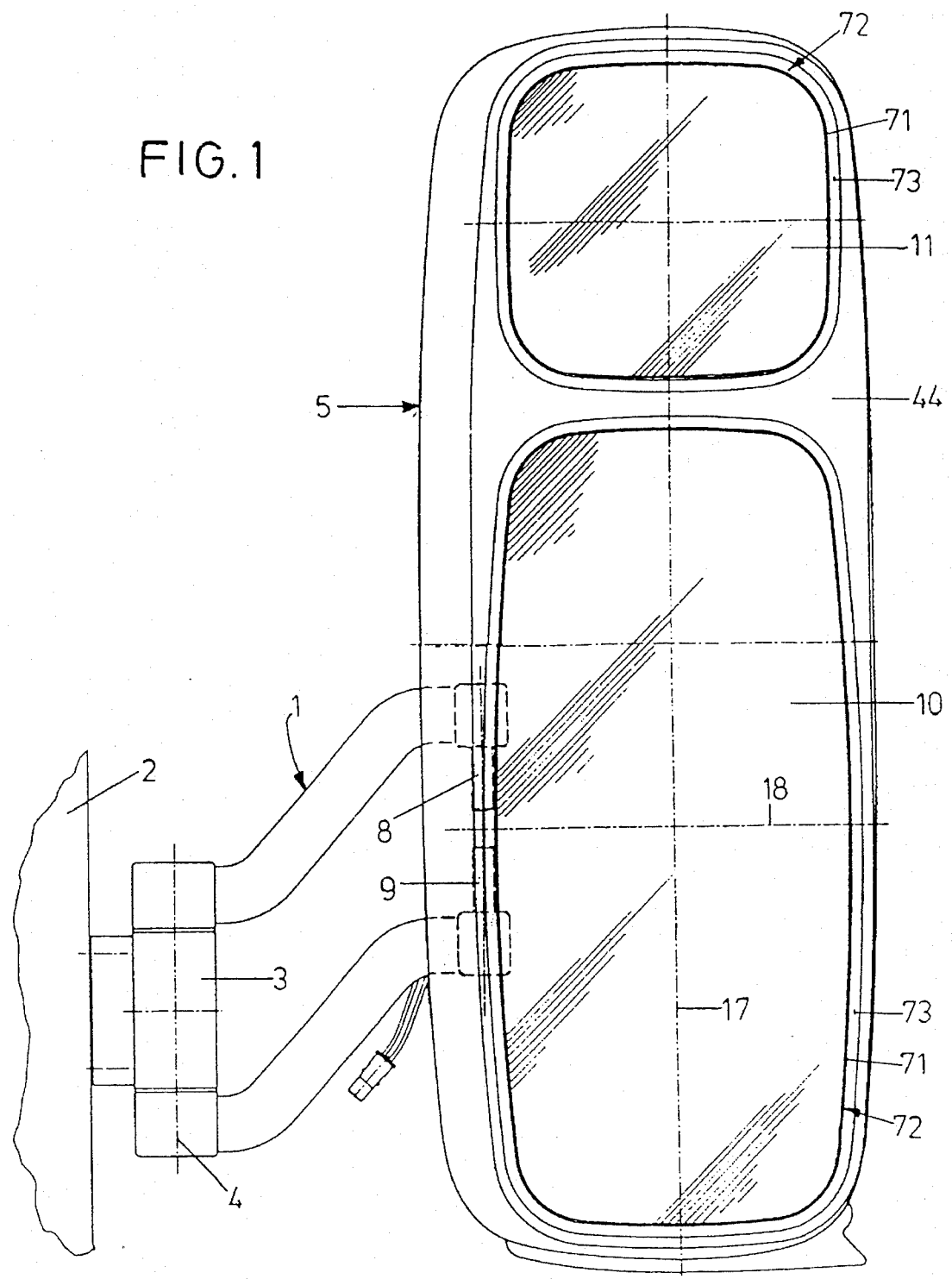
FIG. 1 is a plan view of a external rear-view mirror according to the invention.

The external rear-view mirror for a utility vehicle illustrated in FIGS. 1 to 6 is configured as a double mirror. It has a support formed as a two-armed support arm 1 for the fastening of the mirror on a body part 2 of a utility vehicle only diagrammatically outlined in FIG. 1. On the side of the body, the two-armed support arm 1 is fastened on a pillow block 3 pivotably about a vertical axis 4.

A bearing plate 6, which is secured to the two retaining pins 8, 9 at the free ends of the two-armed support arm 1 by means of a retaining device 7, is arranged in an aerodynamically formed housing 5 of the mirror. The housing 5 is directly retained on this bearing plate 6. Where appropriate, the bearing plate 6 may have recesses—not shown in detail—for the purpose of weight reduction.

Further, two mirror glasses 10, 11 are supported on the bearing plate 6 to be pivotable by means of a pivoting hinge 12, 13 in the form of a ball-and-socket joint. The lower mirror glass 10 represents the slightly convex main mirror glass, whereas the upper mirror glass 11 is a smaller wide angle mirror.

Figure 3:
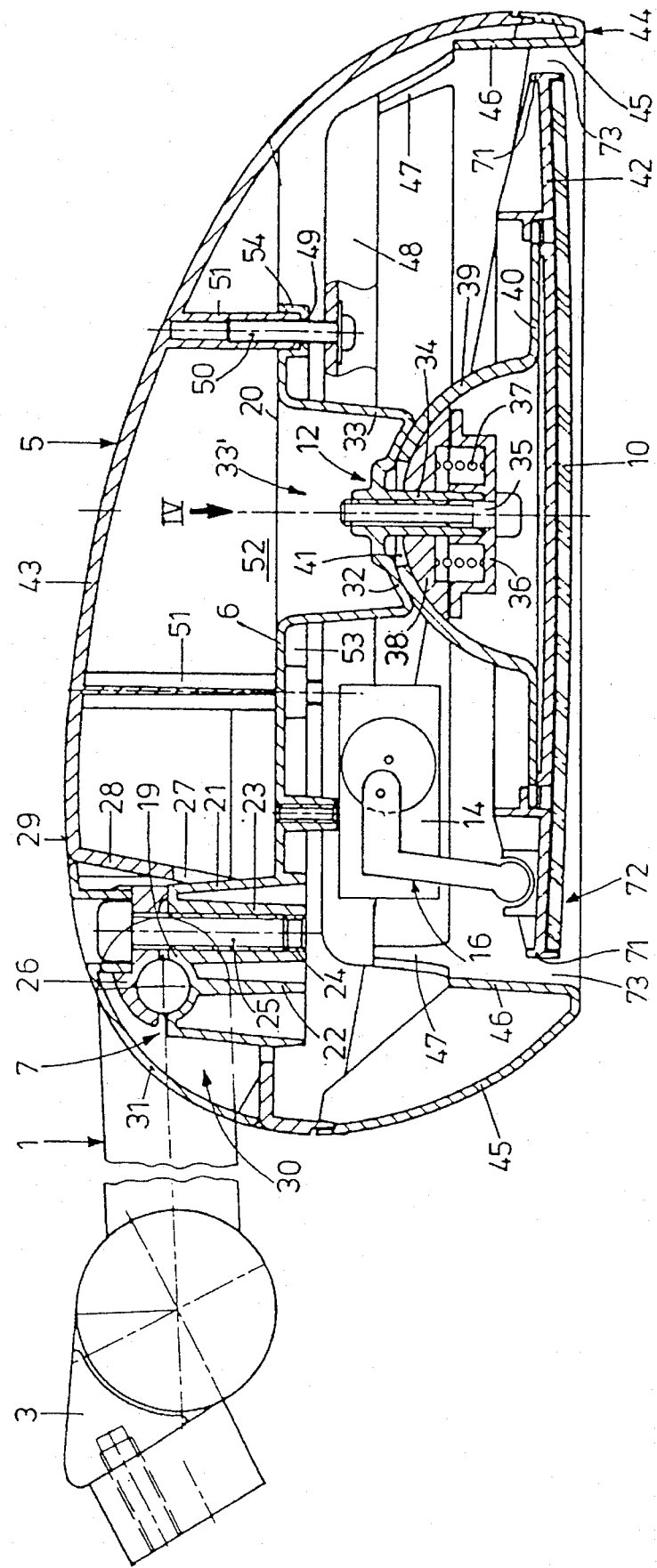
FIG. 3 is a cross-section through the mirror according to FIGS. 1 and 2 along the section line III—III according to FIG. 2.

Two adjusting units 14, 15 in the form of electric gear motors are associated with the lower mirror glass 10 and coupled to the mirror glass 10 by way of a crank mechanism 16 roughly outlined in FIG. 3. The mirror glass 10 can be adjusted by the adjusting units 14, 15 about two adjusting axes 17, 18 perpendicular relative to each other for the mirror glass 10 to be set.

The retaining device 7 is configured as a clamping device, of which the clamping end bearing 19 for the retaining pins 8, 9 of the support arm 1 is made in one piece with the bearing plate 6. The clamping end bearing 19 is arranged on the free end of a substantially parallelepiped projection 21, which protrudes from the plate plane 20 of the bearing plate 6, which is hollow on its inside and which is reinforced by reinforcement ribs 22 formed integrally with it. Further, a sleeve 23 having an internal thread 24 for the securing screw 25 to be screwed in from outside for the clamping claw 26 forming the clamping member of the clamping device 7 is formed integrally on the inside of the projection 21. By means of the securing screw 25, the clamping claw 26 is fastenable to the clamping end bearing 19 by force locking, whereby the bearing plate 6 is tightly united with the retaining pins 8, 9 of the support arm 1 by the clamping locking of the clamping device.

Figure 2:
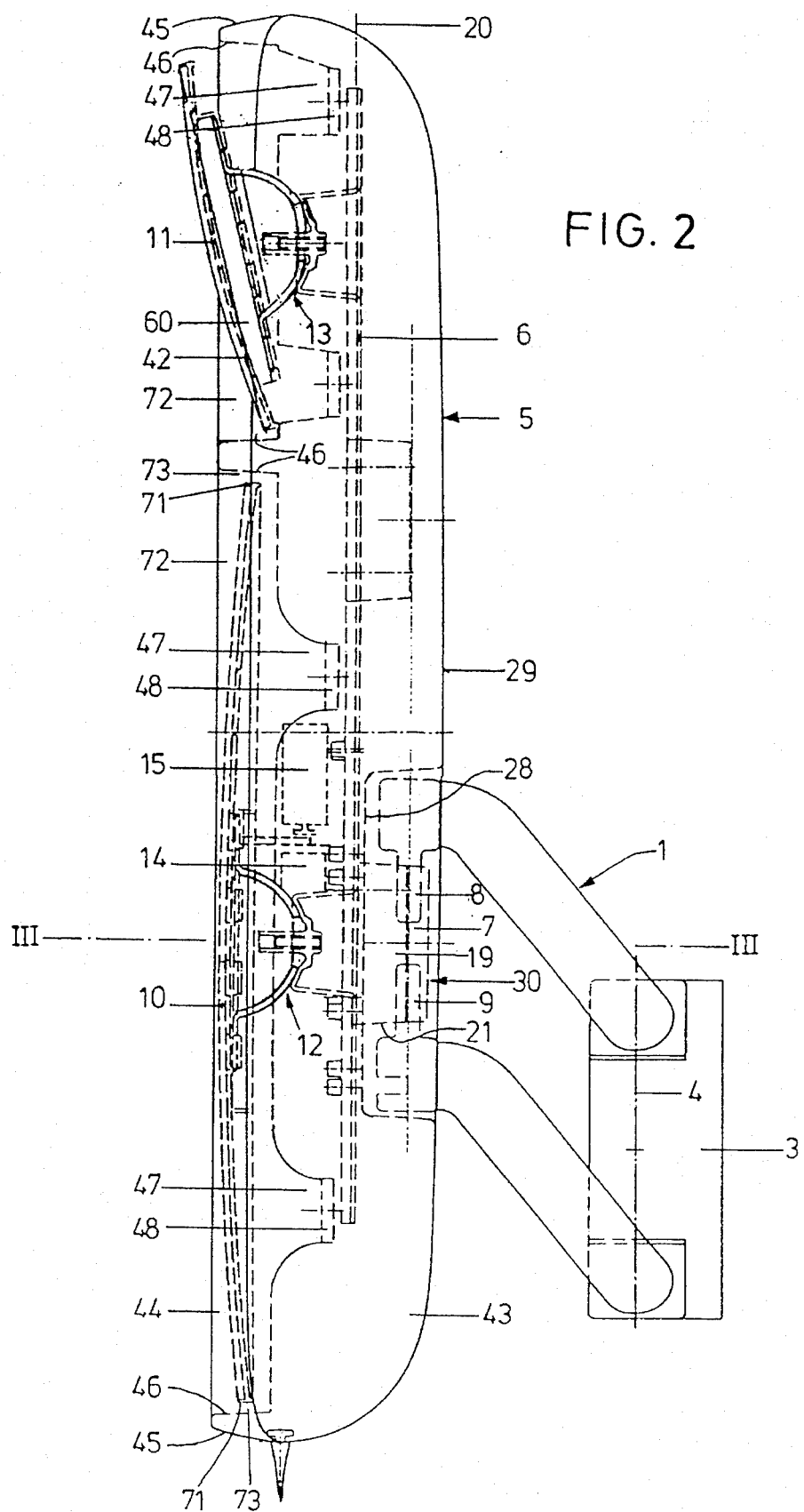
FIG. 2 is a lateral view of the mirror according to FIG. 1.

In the position of mounting shown in FIG. 2, the projection 21 protrudes through a housing opening 27 arranged in the angularly shaped bottom 28 of a housing recess 30 arranged on the outside 29 of the housing. Thus, the clamping end bearing 19 and the clamping claw 26 of the clamping device 7 are arranged on the outside 29 of the housing in the housing recess 30 and, as a result, they are easily accessible for the assembly of the mirror and the support arm 1. The clamping device 7 is covered outward by a covering cap 31, which is arranged within the housing recess 30 and retained by the securing screw 25.

In the following, the configuration of the two pivoting hinges 12, 13 will be described taken in conjunction with FIG. 3, which shows the pivoting hinge 12 associated with the lower mirror glass 10. The upper pivoting hinge 13 is of corresponding design.

The pivoting hinge 12 is configured as a bail-and-socket joint on the bearing plate 6, the bearing shell 32 of the ball-and-socket joint being formed in one piece with the bearing plate 6. The bearing shell 32 is arranged at the free end of an annular projection 33 protruding from the plate plane 20 of the bearing plate 6. The projection 33 with the bearing shell 32 is in the form of a cap-shaped convexity 33' of the bearing plate 6 and extends in the direction opposite to the projection 21.

Centrally, the bearing shell 32 has a vertically extending threaded sleeve 34 likewise formed in one piece with it, into which a securing screw 35 for an abutment cap 36 located on the threaded sleeve 34 is screwed. A compression spring 37 acting upon a pressing element 38 in the shape of a ball segment in the direction towards the bearing shell 32 of the pivoting hinge 12 bears against the inside of the abutment cap 36. A semi-spherical end bearing shell 39 formed on a plain retaining plate 40 for the mirror glass 10 extends between the pressing element 38 and the bearing shell 32. The end bearing shell 39 has a central opening 41 through which the threaded sleeve 34 extends with clearance. A mirror supporting plate 42, with which the mirror glass 10 is permanently united by adhesion, is releasably fixed on the retaining plate 40.

As further seen in the drawings, tile housing 5 consists of two parts, of a main housing part 43 and a frame part 44 laterally encircling the mirror glasses 10, 11. The frame part 44 has an external edge portion 45 as well as internal wall sections 46 spaced from the edges of the mirror glasses 10, 11 and flanking the latter. Joining braces 47 formed integrally and having a retaining ridge 48 extending parallel to tile bearing plate 6 extend from these wall sections 46 in the direction towards the bearing plate 6. By means of these retaining ridges 48, the frame part 44 is fastened by a securing screw 50 on fastening elements integrally formed in the bearing plate 6. These fastening elements are openings 49 in the bearing plate 6 which are arranged in cup-shaped recesses. The securing screws simultaneously retain the main housing part 43 in that the securing screws 50 reach through the openings 49 on the bearing plate and engage with threaded sleeves 51 on the main housing part 43 which are formed in one piece with the latter. The main housing part 43 and the frame part 44 are united with the bearing plate 6 and with each other from the flat sides 52, 53 of the latter facing away from each other. The bearing plate 6, the main housing part 43 and the frame part 44 are joined together in the way of a sandwich construction.

Figure 4:
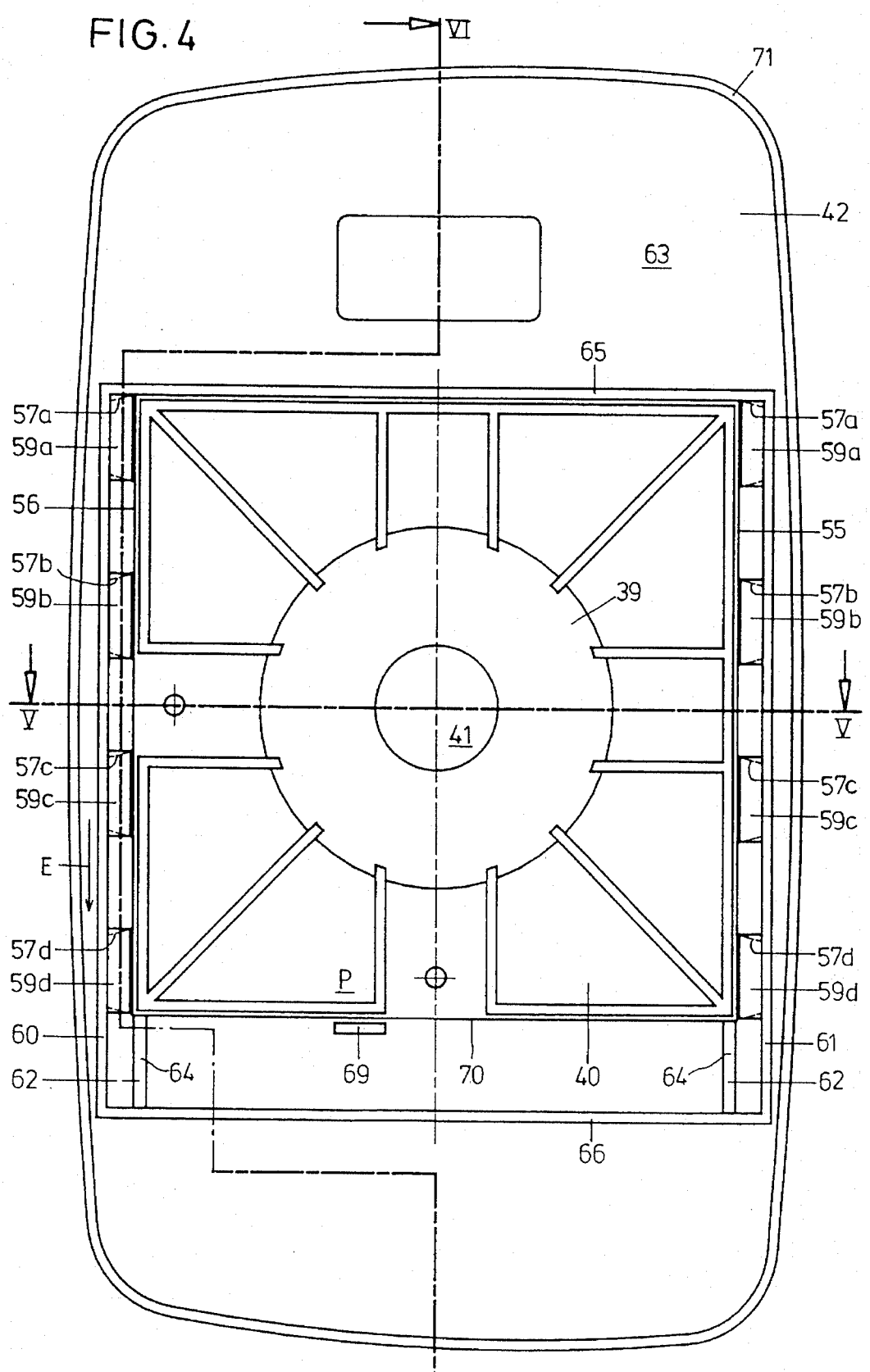
FIG. 4 is a plan view of a retaining and mirror supporting plate in their locked position seen from the direction of arrow IV according to FIG. 3.
Figure 5:
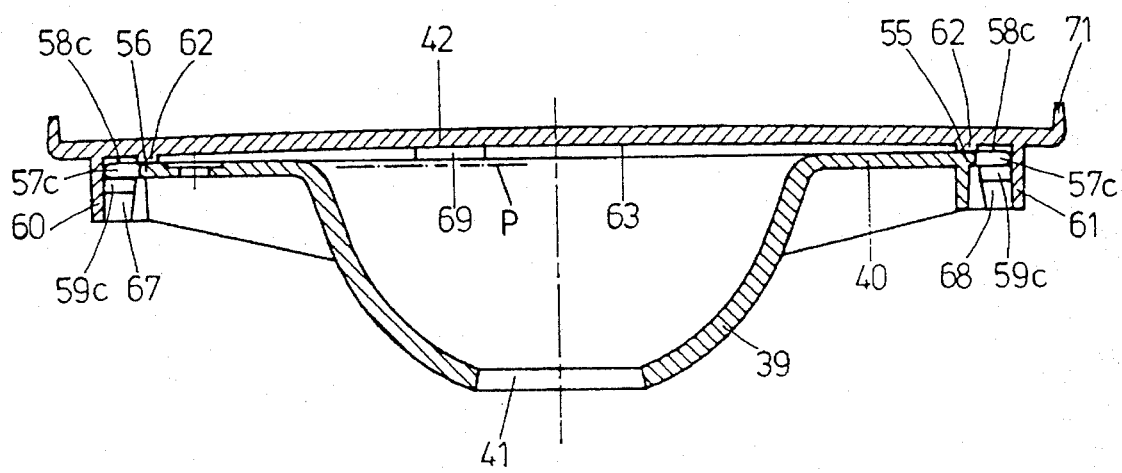
FIG. 5 is a horizontal section through this arrangement according to section line V—V according to FIG. 4.

The releasable fastening, mentioned above, of each mirror supporting plate 42 on the retaining plate 40 formed in one piece with the end bearing shell 39 of the pivoting hinge 12 and 13 will become apparent taken in conjunction with FIGS. 4 to 7. For instance, in the vicinity of its parallel lateral edges 55, 56 extending vertically and facing each other, the retaining plate 40 is provided with four joining projections 57a, b, c, d which are rectangular in a plan view and which are formed integrally on the retaining plate 40 and which are located in the plate plane P. By means of these joining projections 57a, b, c, d, the retaining plate 40 is insertable by clamping into rear-recessed portions 58a, b, c, d of complementary shape on the mirror supporting plate 42 in the direction of insertion E directed in parallel to the plate plane P. These rear-recessed portions 58a, b, c, d are on the one hand formed by retaining projections 59a, b, c, d which are integrally adjoined to webs 60, 61 extending inwardly on tile mirror supporting plate 42 and parallel to the direction of insertion E of the joining projections 57a, b, c, d on both sides of the retaining plate 40. These retaining projections 59a, b, c, d are likewise rectangular in a plan view. On both sides of the mirror supporting plate 42, on the sides opposite to the retaining projections 59a, b, c, d, the rear-recessed portions 58a, b, c, d are defined by a continuous supporting rib 62 extending parallel to the direction of insertion E on the inside 63 of tile mirror supporting plate 42. As seen in FIG. 4, two of these supporting ribs 62 extend flush with the two lateral edges 55, 56 in the direction of insertion E. The upper edge 64 of these supporting ribs 62 is plain. The joining projections 57a, b, c, d and the retaining projections 59a, b, c, d are of about the same length referred to the direction of insertion E, as seen in particular in FIGS. 4 and 7. They show tile mirror supporting plate 42 in the final position of mounting of the retaining plate 40, the retaining projections 59a, b, c, d of the mirror supporting plate 42 shown in solid lines and the joining projections 57a, b, c, d shown in a dashed line virtually overlapping.

Referred to the direction of insertion E, the free distance a between the retaining projections 59a, b, c, d on the mirror supporting plate 42 slightly exceeds the length of the joining projections 57a, b, c, d in this direction. In this regard, starting from the initial position of mounting shown in FIG. 6, the mirror supporting plate 42 can be pushed on the retaining plate 40 at right angles to the direction of insertion E, the joining projections 57a, b, c, d and the retaining projection 59a, b, c, d passing through the respective gaps between the elements complementary to them until the retaining plate 40 comes to rest on the supporting ribs 62. By means of subsequent relative displacement of the retaining plate 40 and the mirror supporting plate 42, the joining projections 57a, b, c, d are slipped into the corresponding rear-recessed portions 58a, b, c, d by clamping until the final position of mounting of FIG. 7 is reached and both plates 40, 42 are stably united free of vibration.

The transverse ridges 65, 66 formed integrally on the mirror supporting plate 42 between the ends of the ridges 60, 61 serve as a mounting aid for the inserting motion. For instance, the transverse ridge 66 located at the bottom in FIG. 6 serves as a positioning aid for positioning the retaining plate 40 and the mirror supporting plate 42 relative to each other. The upper transverse ridge 65 serves as a limit stop for the sliding motion so that the final position of mounting shown in FIGS. 4 and 7 is exactly defined. Not least, the ridges 60, 61 and the transverse ridges 65, 66 form an encircling frame part for the stabilization and covering of the entire assembled construction.

The bevelled insertion lugs 67, 68 projecting inwards from the retaining projections 59b, c and integrally formed on the ends of the latter directing into or opposite the direction of insertion E serve as further inserting aids.

Figure 7:
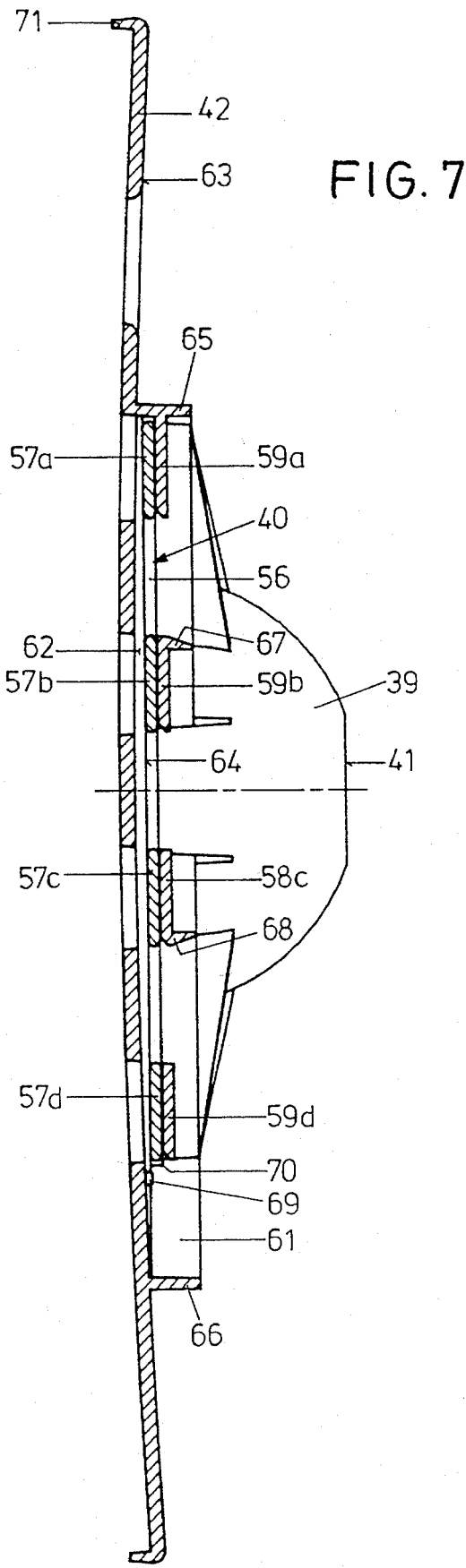
FIG. 7 is a vertical section according to FIG. 6 in the final position of mounting of the arrangement.

The locking projection 69, which is arranged on the inside 63 about in the center portion between the two supporting ribs 62 and which backs from beneath the transverse lateral edge 70, directed opposite the direction of insertion E, of the retaining plate 40 in the final position of mounting shown in FIGS. 4 and 7, serves as a further securing means for the assembly of the retaining plate 40 and the mirror supporting plate 42 in the final position of mounting.

The relative path of displacement between the retaining plate 40 and to the mirror supporting plate 42 is greater than the spacing gap 73 remaining between the external edge 71 of the mirror supporting plate 42 and the wall section 46 defining the housing opening 72. Thus, in a normal rear-view position of the mirror as shown in FIG. 2 for the lower main mirror (mirror glass 10), the mirror supporting plate 42 is encircled by the housing 5 such that any complete release of the sliding engagement between the mirror supporting plate 42 and the retaining plate 40 is impossible. For, before the sliding engagement of the joining projections 57a, b, c, d with the rear-recessed portions 58a, b, c, d is released, the mirror supporting plate 42 will bear against the corresponding wall section 46 of the housing.

Figure 6:
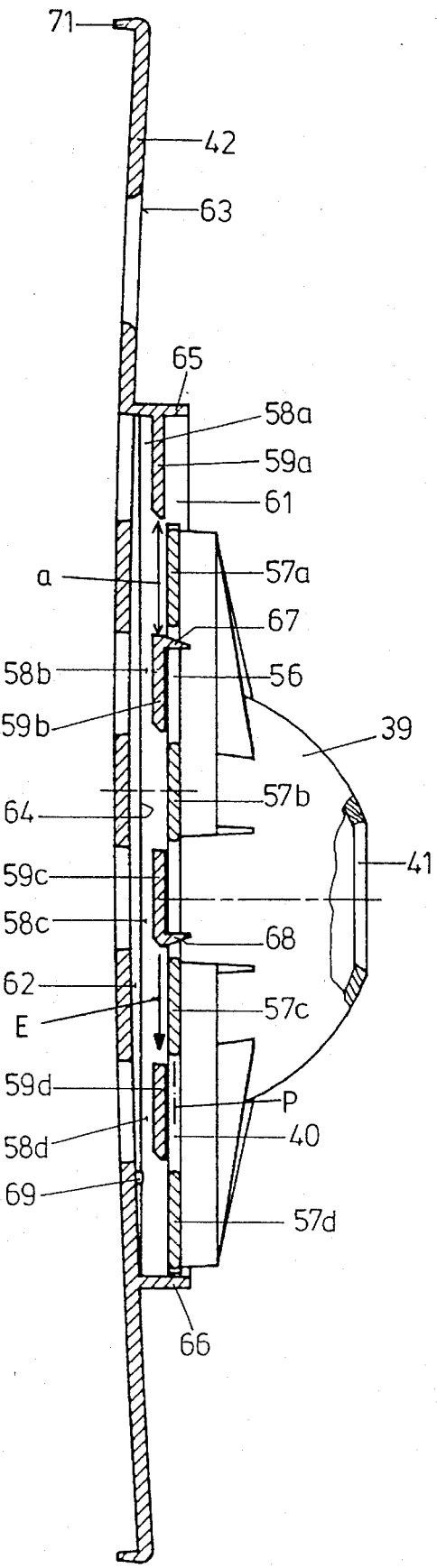
FIG. 6 is a vertical section through the arrangement along the section line VI—VI according to FIG. 4 in the initial position of mounting.

It is only when the structural unit of the mirror supporting plate 42 and the retaining plate 40 has been pivoted into an extremely tilted position of mounting with the aid of the pivoting hinge 12, 13 as shown by the additional mirror (mirror glass 11) of FIG. 2, that the mirror supporting plate 42 can be moved completely out of the final position of mounting shown in FIG. 6 and lifted from the retaining plate 40. Removal of the mirror supporting plate 42 and re-insertion is only possible in such an extremely tilted position.

What is claimed is:

1. An adjustable rear-view mirror arrangement for motor vehicles comprising a housing (5) with a housing opening (72);

a bearing arrangement (12, 13) arranged in the housing (5);

a retaining plate (40) united with the bearing arrangement and provided with two lateral edges (55, 56) opposite to each other and a plate plane (P);

a mirror supporting plate (42) releasably fastenable to said retaining plate (40); and a mirror glass (10, 11) mounted on said mirror supporting plate (42) and arranged in said housing opening (72), wherein adjacent to said lateral edges (55, 56), the retaining plate (40) is provided with joining projections (57a, b, c, d), which for being fastened to the mirror supporting plate (42), are insertable in a direction of insertion by clamping (E) into rear-recessed portions (58a, b, c, d) of complementary shape on the mirror supporting plate (42) substantially in parallel to said plate plane (P).

2. The rear-view mirror arrangement according to claim 1, wherein the joining projections (57a, b, c, d) are formed in one piece on the retaining plate (40) and located on the latter's lateral edges (55, 56) in the plate plane (P).

3. The rear-view mirror arrangement according to claim 1, wherein the clamping is provided for securing the mirror supporting plate (42) on the retaining plate (40) in the final position of mounting.

4. The rear-view mirror arrangement according to claim 3, wherein the clamping is formed by a locking projection (69) projecting from an inside (63) of the mirror supporting plate (42) and backing a transverse lateral edge (70), directed opposite the direction of insertion (E), of the retaining plate (40) in the final position of mounting.

5. A rear-view mirror arrangement comprising:

a housing (5) with a housing opening (72);

a bearing arrangement (12, 13) arranged in the housing (5);

a retaining plate (40) united with the bearing arrangement and provided with two lateral edges (55, 56) opposite to each other and a plate plane (P);

a mirror supporting plate (42) releasably fastenable to said retaining plate (40); and a mirror glass (10, 11) mounted on said mirror supporting plate (42) and arranged in said housing opening (72), wherein adjacent to said lateral edges (55, 56), the retaining plate (40) is provided with joining projections (57a, b, c, d), which for being fastened to the mirror supporting plate (42), are insertable in a direction of insertion (E) by clamping into rear-recessed portions (58a, b, c, d) of complementary shape on the mirror supporting plate (42) substantially in parallel to said plate plane (P), wherein on both sides of the retaining plate (40), the mirror supporting plate (42) is provided with ridges (60,61) projecting inwards and extending parallel to the direction of insertion (E) of the joining projections (57a, b, c, d) from which ridges (60, 61) retaining projections (59a, b, c, d) project in a direction towards each other forming the rear-recessed portions (58a, b, c, d).

6. The rear-view mirror arrangement according to claim 5, wherein on a side opposite the retaining projections (59a, b, c, d), the rear-recessed portions (58a, b, c, d) are defined by continuous supporting ribs (62) extending parallel to the direction of insertion (E) on an inside (63) of the mirror supporting plate (42).

7. The rear-view mirror arrangement according to claim 5, wherein the joining projections (57a, b, c, d) and the retaining projections (59a, b, c, d) are of about equal length referred to the direction of insertion (E).

8. The rear-view mirror arrangement according to claim 5, wherein referred to the direction of insertion (E), a free distance (a) between the retaining projections (59a, b, c, d) slightly exceeds the length of the joining projections (57a, b, c, d).

9. The rear-view mirror arrangement according to claim 5, wherein the ridges (60, 61) extending parallel to the direction of insertion (E) are united at their ends by transverse ridges (65, 66) to form an encircling frame part.

10. The rear-view mirror arrangement according to claim 5, wherein on the insides facing away from the rear-recessed portions (58b, c), insertion lugs (67, 68) are arranged on the retaining projections (59b, c) for the guidance of the plates (40, 42) relative to each other when the mirror supporting plate (42) is placed on the retaining plate (40).

11. The rear-view mirror arrangement according to claim 5 wherein the joining projections (57a, b, c, d) are formed in one piece on the retaining plate (40) and located on the latter's lateral edges (55, 56) in the plate plane (P).

12. The rear-view mirror arrangement according to claim 5 wherein the clamping is formed by a locking projection (69) projecting from an inside (63) of the mirror supporting plate (42) and backing a transverse lateral edge (70), directed opposite the direction of insertion (E), of the retaining plate (40) in the final position of mounting.

13. A rear-view mirror arrangement comprising:

a housing (5) with a housing opening (72);

a bearing arrangement (12, 13) arranged in the housing (5);

a retaining plate (40) united with the bearing arrangement and provided with two lateral edges (55, 56) opposite to each other and a plate plane (P);

a mirror supporting plate (42) releasably fastenable to said retaining plate (40); and a mirror glass (10, 11) mounted on said mirror supporting plate (42) and arranged in said housing opening (72).

wherein adjacent to said lateral edges (55, 56), the retaining plate (40) is provided with joining projections (57a, b, c, d), which for being fastened to the mirror supporting plate (42), are insertable in a direction of insertion (E) by clamping into rear-recessed portions (58a, b, c, d) of complementary shape on the mirror supporting plate (42) substantially in parallel to said plate plane (P) on the one hand, in a rear-view position of the bearing arrangement (12, 13), an external edge (71) of the mirror supporting plate (42) is encircled by an edge (46) of the housing forming the housing opening (72) while leaving a spacing gap (73) such that a complete release of a sliding engagement of the mirror supporting plate (42) with the retaining plate (40) is impossible, and in that on the other hand, in an extremely tilted position of mounting of the bearing arrangement (12, 13), the mirror supporting plate (42) is removable out of the housing opening (72) by the releasing of the sliding engagement with the retaining plate (40) and insertable therein by the production of the sliding engagement.

14. The rear-view mirror arrangement according to claim 13 wherein the joining projections (57a, b, c, d) are formed in one piece on the retaining plate (40) and located on the latter's lateral edges (55, 56) in the plate plane (P).

15. The rear-view mirror arrangement according to claim 13 wherein on both sides of the retaining plate (40), the mirror supporting plate (42) is provided with ridges (60, 61) projecting inwards and extending parallel to the direction of insertion (E) of the joining projections (57a, b, c, d), from which ridges (60, 61) retaining projections (59a, b, c, d) project in a direction towards each other forming the rear-recessed portions (58a, b, c, d).

16. The rear-view mirror arrangement according to claim 13 wherein the clamping formed by a locking projection (69) projecting from an inside (63) of the mirror supporting plate (42) and backing a transverse lateral edge (70), directed opposite the direction of insertion (E), of the retaining plate (40) in the final position of mounting.

17. The rear-view mirror arrangement according to claim 5 wherein the clamping is provided for securing the mirror supporting plate (42) on the retaining plate (40) in the final position of mounting.

18. The rear-view mirror arrangement according to claim 13 wherein the clamping is provided for securing the mirror supporting plate (42) on the retaining plate (40) in the final position of mounting.

* * * * *

UNITED STATES PATENT AND TRADEMARK OFFICE
CERTIFICATE OF CORRECTION

PATENT NO. : 5,615,054
DATED : Mar. 25, 1997
INVENTOR(S) : Heinrich Lang, et al

It is certified that error appears in the above-indentified patent and that said Letters Patent is hereby corrected as shown below:

Claim 16, Col. 8, line 47, delete "clamping formed" and insert --clamping is formed--.

Claim 1, col. 6, line 48, delete "insertion by clamping (E) into" and insert --insertion (E) by clamping into--.

Signed and Sealed this

Twenty-second Day of July, 1997

*Attest:*

BRUCE LEHMAN

*Attesting Officer*   Commissioner of Patents and Trademarks